US006865888B2

(12) United States Patent
Gründl et al.

(10) Patent No.: US 6,865,888 B2
(45) Date of Patent: Mar. 15, 2005

(54) TURBOCHARGER FOR AN INTERNAL COMBUSTION ENGINE WITH PISTONS

(75) Inventors: Andreas Gründl, München (DE); Bernhard Hoffmann, Starnberg (DE)

(73) Assignee: Compact Dynamics GmbH, Starnberg (DE)

( * ) Notice: Subject to any disclaimer, the term of this patent is extended or adjusted under 35 U.S.C. 154(b) by 37 days.

(21) Appl. No.: 10/275,599

(22) PCT Filed: May 17, 2001

(86) PCT No.: PCT/EP01/05665

§ 371 (c)(1),
(2), (4) Date: Nov. 6, 2002

(87) PCT Pub. No.: WO01/88351

PCT Pub. Date: Nov. 22, 2001

(65) Prior Publication Data

US 2003/0121264 A1 Jul. 3, 2003

(30) Foreign Application Priority Data

May 17, 2000 (DE) .................. 100 24 390

(51) Int. Cl.⁷ .................. F02B 33/44; F02B 39/10; H02K 1/12
(52) U.S. Cl. .................. 60/608; 60/597; 310/261; 310/254
(58) Field of Search .................. 60/608, 607, 597; 123/565; 310/261, 254, 138; F02B 39/10

(56) References Cited

U.S. PATENT DOCUMENTS

| | | | | |
|---|---|---|---|---|
| 1,840,253 A | * | 1/1932 | Richardson | 123/565 |
| 3,576,455 A | | 4/1971 | Ingenito | |
| 4,485,310 A | * | 11/1984 | de Valroger | 123/565 |
| 4,769,993 A | | 9/1988 | Kawamura | 60/608 |
| 5,638,796 A | | 6/1997 | Adams, III et al. | |
| 5,652,493 A | | 7/1997 | Hendershot, Jr. | |
| 6,097,118 A | * | 8/2000 | Hull | 310/74 |
| 6,591,612 B2 | * | 7/2003 | Bolz et al. | 60/608 |
| 2003/0106541 A1 | * | 6/2003 | Dixon et al. | 123/565 |

FOREIGN PATENT DOCUMENTS

| | | | |
|---|---|---|---|
| DE | 199 38 624 A 1 | 8/1999 | F02B/39/10 |
| JP | 06146912 A | * 5/1994 | 123/565 |

* cited by examiner

Primary Examiner—Thai-Ba Trieu
(74) Attorney, Agent, or Firm—Pierce Atwood; Kevin M. Farrell

(57) ABSTRACT

A turbo-compressor (20, 121) for a piston combustion engine (10), with the turbo-compressor (20, 121) comprising a fresh air inlet (24) and a fresh air outlet (26), with the turbo-compressor (20, 121) to be connected with the combustion engine (10) via the fresh air outlet (26), the turbo-compressor (20, 121) comprising a transmission shaft (32) coupled with an electric machine (30) for at least one compressor wheel (34), in order to set the compressor wheel (34) in rotation via the electric machine (30), whereby compressed fresh air is provided at the fresh air outlet (26) for the combustion engine (10), and with the electric machine (30) being a reluctance machine.

10 Claims, 2 Drawing Sheets

TURBOCHARGER FOR AN INTERNAL COMBUSTION ENGINE WITH PISTONS

BACKGROUND OF THE INVENTION

The present invention relates to a turbo-compressor for a piston combustion engine.

STATE OF THE ART

Concepts for turbo-compressors are known in the state of the art, which compress the supplied fresh air for the piston combustion engine by means of an electric motor. The previous approaches for a solution can, however, be realised for series production with considerable restrictions only. The speed of such an electric motor must be relatively high (approx. 120,000 to 200,000 revolutions per minute) in order to provide the required charging pressures. These high speeds with small moved masses are to be provided by means of a compact electric motor in order to ensure a good dynamic behaviour at speed changes as well as sufficiently high power (several kilowatts for combustion engines of passenger cars). In addition, the operating conditions for the electric motor are relatively unfavourable due to the high thermal loads of the turbo-compressor, the vibration of the combustion engine with which the turbo compressor is connected, etc. Finally, the fatigue strength of the electric motor and its economic manufacture are also essential criteria in the design of the turbo-compressor and the electric motor to be employed therein.

DE 199 38 624 A1 discloses an exhaust gas turbocharger with an exhaust turbine which is drivingly connected with a centrifugal compressor via a turbine shaft. The turbine shaft can be coupled with the compressor shaft via an override clutch which is locking in drive direction. A reluctance motor is arranged on the turbine shaft, whose rotor is drivingly connected with the centrifugal compressor.
Problem on which the Invention is Based The invention is based on the problem to provide a turbo-compressor for a piston combustion engine, which comprises the above mentioned properties, in order to be able to be employed in the large-scale production in the field of motor vehicles.
Inventive Solution For the solution of this problem, the invention teaches a turbo-compressor for a piston combustion engine, with the turbo-compressor comprising a fresh air inlet and a fresh air outlet, with the turbo-compressor to be connected with the combustion engine via the fresh air outlet, the turbo-compressor comprising a transmission shaft coupled with an electric machine for at least one compressor wheel, in order to set the compressor wheel in rotation by means of the electric machine, whereby compressed fresh air is provided at the fresh air outlet, and with the electric machine being a reluctance machine.

The reluctance machine of the turbo compressor comprises a stator arrangement surrounding the rotor, which essentially consists of C-shaped yokes, with each yoke comprising two free legs each of which protrudes so far in the direction of the rotor that they at least partially cover the teeth arranged at the faces of a rotor, if the teeth of the rotor are in alignment with the legs of the yokes.

Such a turbo-compressor meets the above mentioned requirements and can be provided with a very small mass inertia of the drive motor for the compressor wheel, so that for example a speed change from approx. 2000 rpm to approx. 100,000 rpm can be effected in 200 ms.

In a preferred embodiment of the inventive turbo-compressor the reluctance machine comprises an essentially circular cylindrical rotor which has teeth from stacked iron sheet, arranged coaxially to its axis of ration and spaced from one another. This allows a particularly easy large-scale production with very good electric/magnetic properties.

In a variant from this the essentially circular cylindrical rotor is formed from a spirally wound iron sheet, with grooves being machined coaxially to the axis of rotation of the rotor into the casing surface of the rotor, between which the teeth are formed. Alternatively, the essentially circular cylindrical rotor can be formed by a non-metallic carrier body in which recesses are provided coaxially to the axis of rotation of the rotor and distributed along the circumference, into which the teeth from stacked iron sheet are inserted.

In order to achieve a steep as possible modulation characteristic of the magnetic field of the reluctance motor, the teeth in one embodiment are interrupted in their longitudinal direction by transversely oriented recesses.

Furthermore and according to the invention the rotor comprises a stator coil which surrounds the rotor at least partially.

According to the invention the rotor is connected locked against rotation with the transmission shaft for the at least one compressor wheel.

The arrangement of the turbo-compressor configured in this manner uses an internal-rotor machine as drive. It is, however, also possible to realise an external-rotor machine with the inventive concept.

In another configuration of the inventive idea a turbo-charger for a piston combustion engine is provided, with the turbo-charger comprising a fresh air inlet and a fresh air outlet, with the turbocharger to be connected with the combustion engine via the fresh air outlet, the turbocharger comprising a transmission shaft coupled with an electric machine for at least one compressor wheel, in order to set the compressor wheel in rotation by means of the electric machine, whereby compressed fresh air is provided at the fresh air outlet, and with the electric machine being a reluctance machine, with the turbocharger additionally comprising an exhaust gas inlet and an exhaust gas outlet, with the turbocharger to be connected with the combustion engine via the exhaust gas outlet, at least one turbine wheel being arranged on the transmission shaft coupled with the electric machine, which is set in rotation by the exhaust gas flow from the combustion engine. The reluctance machine comprises a stator which consists of essentially C-shaped yokes, with each yoke protruding so far radially inwards that they at least partially cover the teeth arranged at the faces of the rotor, if the teeth of the rotor are in alignment with the legs of the yokes.

In addition to the reluctance motor-driven operation, this enables a combustion engine-driven operation of the inventive turbocharger with the exhaust gas of the combustion engine.

According to the invention, a control circuit for the electric machine is provided for this purpose, which controls same in such a manner that with a low speed of the combustion engine the turbo-compressor with the aid of the electric motor provides compressed fresh air for the combustion engine.

Furthermore, the control circuit for the electric machine controls same in such a manner that with a high speed of the combustion engine, the electric machine operates as a generator and provides electric power.

Although the inventive turbo-compressor as it has been described above has particularly excellent properties and advantages, the invention is not limited to the turbo-compressor alone. It equally relates to the reluctance motor per se, as it has been described above.

Further properties, characteristics, advantages, and modifications will become apparent from the following description of the drawing in which embodiments of the invention are illustrated.

DESCRIPTION OF A PREFERRED EMBODIMENT

Figure 1:
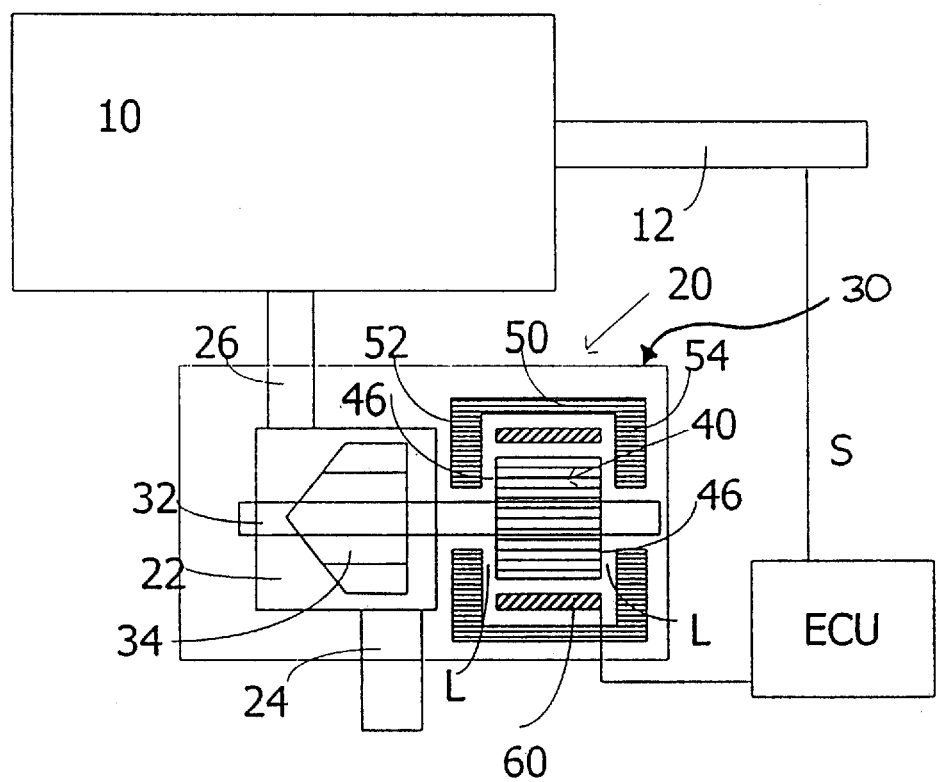
FIG. 1 shows a first embodiment of the inventive turbo-compressor with a reluctance motor in a schematic representation in which the turbo-compressor is connected with a combustion engine.

In the single figure, an embodiment of the invention is shown, with an inventive turbo-compressor 20 being provided at a (depicted schematically only) piston combustion engine 10. The illustration of the turbo-compressor 20 is in its relation to the piston combustion engine 10 is not drawn to scale.

The turbo-compressor 20 has a compressor chamber 22 with a fresh air inlet 24 and a fresh air outlet 26 for the provision of compressed air for the combustion engine 10. For this purpose, the air inlet of the combustion engine 10 is connected with the turbo-compressor 20 via the fresh air outlet 26 of same. The turbo-compressor 20 has a compressor wheel 34 in the compressor chamber 22, which is arranged locked against rotation on a transmission shaft 32. This transmission shaft 32 protrudes laterally from the compressor chamber 22 and is coupled with an electric machine 30, in order to set the compressor wheel 34 in rotation by means of the electric machine 30, whereby compressed fresh air is provided at the fresh air outlet 26. The electric machine 30 of the turbo-compressor 20 is a reluctance machine, the construction of which will be explained in detail in the following.

The reluctance machine 30 has an essentially circular cylindrical rotor 40 which has spaced teeth 42 arranged coaxially with its axis of rotation (the transmission shaft 32) made from stacked iron sheet.

Figure 2:
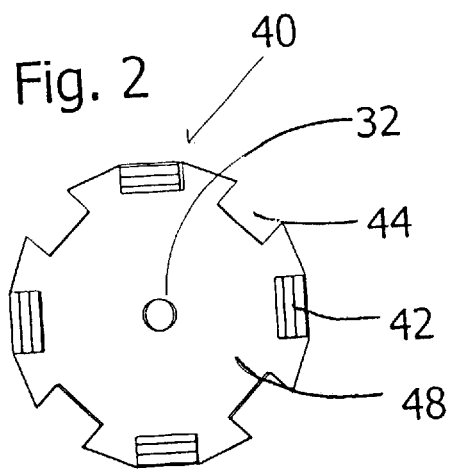
FIG. 2 shows a schematic plan view of a face of a rotor of a reluctance motor as it is shown in FIG. 1.

The rotor 40 is formed by a non-metallic carrier body 48 in which recesses 44 are provided coaxially to the axis of rotation 32 of the rotor 40, into which one tooth 42 each of stacked iron sheet is inserted. For the sake of clarity, FIG. 2 shows the teeth 42 of stacked iron sheet only in a few of the recesses 44. Each of the teeth 42 is dimensioned in such a manner that it does not protrude beyond the circular cylindrical carrier body 48 neither in the axial direction nor in the radial direction. For stability reasons, the rotor may be encompassed by a non-magnetic band (high-grade steel, plastic-reinforced carbon or glass fibre) which ensures that at the high rotor speeds the teeth 42 are not propelled out of the recesses 44.

The teeth 42 may be interrupted in their longitudinal direction by transversely oriented (not shown in detail) recesses. This allows for an adjustment of the air gap distance which is essential for the operation of the reluctance motor 30, without an increase in the axial construction length of the reluctance motor 30.

The reluctance machine 30 additionally comprises a stator arrangement of essentially C-shaped yokes 50 made from stacked iron sheet. Each yoke 50 is dimensioned in such a manner that it protrudes beyond the rotor 40 in the axial direction under forming an air gap L at both faces 46, of the rotor 40. Each yoke 50 has two free legs 52, 54 which protrude so far radially inwards and the number of yokes 50 and their distribution about the rotor 40 is selected in such a manner that they at least partially cover the teeth 42 arranged at the faces 46, of a rotor 40, if the teeth 42 of the rotor 40 are in alignment with the legs 52, 54 of the yokes 50.

Between the yokes 50 and the rotor 40 a circular cylindrical stator coil arrangement 60 is disposed which surrounds the rotor 40 in the area of its casing surface.

Figure 3:
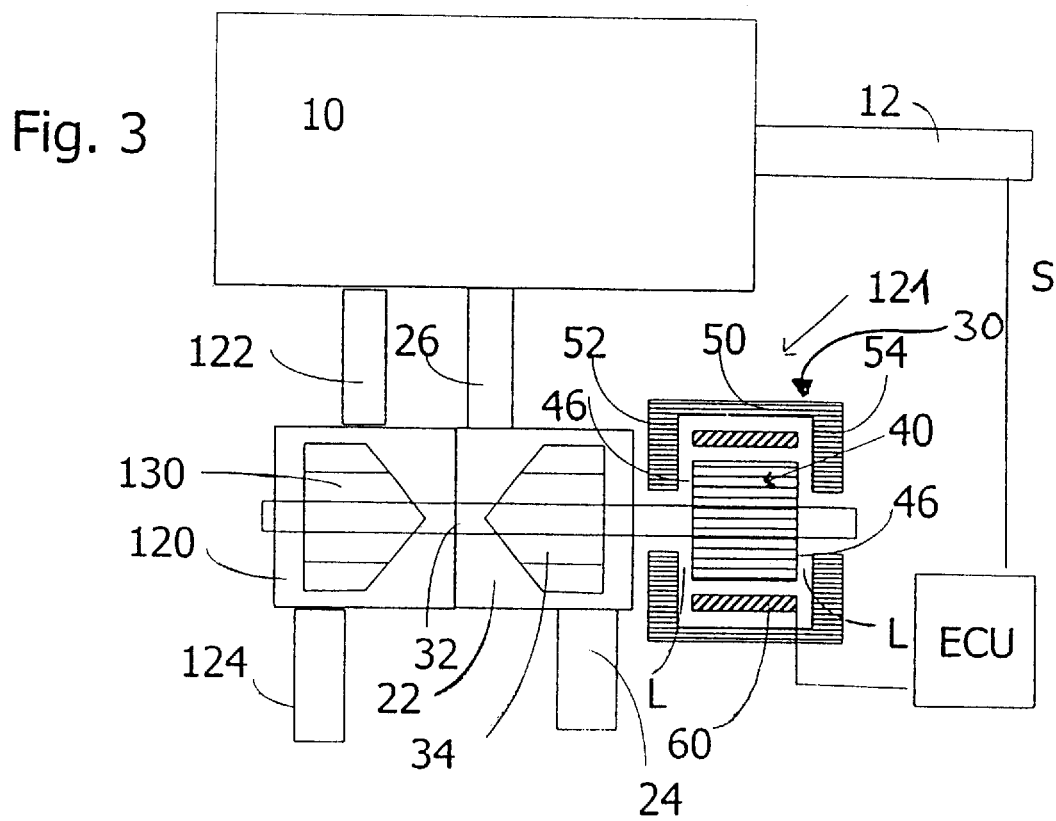
FIG. 3 shows a second embodiment of an inventive turbocharger with a reluctance motor in a schematic representation in which the turbocharger is connected with a combustion engine.

In a further embodiment shown in FIG. 3, the turbo-compressor has an exhaust gas chamber 120 with an exhaust gas inlet 122 and an exhaust gas outlet 124 in addition to the components illustrated in FIG. 1 so that a turbocharger 121 is formed. The exhaust gas chamber 120 is connected with the combustion engine 10 via the exhaust gas inlet 122. The transmission shaft 32 coupled with the electric machine 30, on which a turbine wheel 130 is arranged locked against rotation within the exhaust gas chamber 120, which is set in rotation by an exhaust gas flow from the combustion engine 10, protrudes into the exhaust gas chamber 120. This allows for an exhaust gas-operated auxiliary drive in addition to the electric drive of the compressor wheel 34.

In order to effect the interaction of the turbo-compressor 20, 121 and the combustion engine 10 during operation of the combustion engine 10 in a coordinated manner, a control circuit ECU for the electric machine 30 is provided. This control circuit ECU controls the electric machine 30, depending on a speed signal S from the output shaft 12 of the combustion engine 10 in such a manner that, in particular at a low speed of the combustion engine 10, the turbo-compressor 20, 121 provides compressed fresh air for the combustion engine 10 while supported by the electric motor. In the embodiment according to FIG. 3 the control circuit ECU may also be designed in such a manner that, in addition to the exhaust gas-driven rotation of the compressor wheel 34 at a high speed of the combustion engine 10, the electric machine 30 operates as a generator and provides electric power.

What is claimed is:

1. A turbo-compressor (20, 121) for a piston combustion engine (10), comprising:
    a fresh air inlet (24);
    a fresh air outlet (26), the turbo-compressor (20, 121) to be connected with the combustion engine (10) via the fresh air outlet (26);
    a transmission shaft (32) coupled with an electric machine (30) for at least one compressor wheel (34), in order to set the compressor wheel (34) in rotation by means of the electric machine (30), whereby compressed fresh air is provided at the fresh air outlet (26) for the combustion engine (10); and
    the electric machine (30) being a reluctance machine, characterised in that the reluctance machine (30) comprises a stator arrangement of essentially C-shaped yokes (50), wherein each of the yokes (50) comprises two free legs (52, 54) for protruding radially inwards to at least partially cover teeth (42) arranged at faces (46) of an essentially circular cylindrical rotor (40), the teeth (42) of the rotor (40) being in alignment with the legs (52, 54) of the yokes (50).

2. The turbo-compressor (20, 121) according to claim 1, characterised in that the essentially circular cylindrical rotor

(40) has spaced teeth (42) made from stacked iron sheet, arranged coaxially with a rotational axis of the transmission shaft (32).

3. The turbo-compressor according to claim 2, characterised in that the essentially circular cylindrical rotor (40) is formed from a spirally wound iron sheet, and grooves (44) are machined coaxially to the rotational axis of the transmission shaft (32) of the rotor (40) into a casing surface of the rotor (40), wherein the teeth (42) are formed.

4. The turbo-compressor according to claim 2, characterised in that the essentially circular cylindrical rotor (40) is formed by a non-metallic carrier body (48), wherein the teeth (42) are made from stacked iron sheet, and arranged coaxially with the rotational axis of the transmission shaft (32).

5. The turbo-compressor according to claim 2, characterised in that the teeth (42) are interrupted in longitudinal direction by transversely oriented recesses.

6. The turbo-compressor according to claim 2, characterised in that the essentially circular cylindrical rotor (40) is at least partially encompassed by a stator coil arrangement (60).

7. The turbo-compressor according to claim 1, characterised in that the essentially circular cylindrical rotor (40) is connected locked against rotation with the transmission shaft (32) for the at least one compressor wheel (34).

8. The turbo-compressor according to claim 1, characterised in that a control circuit (ECU) is provided, to control the electric machine (30) while the combustion engine (10) is operating at a low speed.

9. A turbocharger (121) for a piston combustion engine (10), comprising:

a fresh air inlet (24);

a fresh air outlet (26), the turbocharger (121) to be connected with the combustion engine (10) via the fresh air outlet (26);

a transmission shaft (32) coupled with an electric machine (30) for at least one compressor wheel (34), in order to set the compressor wheel (34) in rotation by means of the electric machine (30), whereby compressed fresh air is provided at the fresh air outlet (26) for the combustion engine (10); wherein the electric machine (30) is a reluctance machine;

an exhaust gas inlet (122), the turbocharger (121) to be connected with the combustion engine (10) via the exhaust gas inlet (122);

an exhaust gas outlet (124);

at least one turbine wheel (130) being arranged on the transmission shaft (32) coupled with the electric machine (30), which is set in rotation by an exhaust gas flow from the combustion engine (10), characterised in that—the reluctance machine (30) comprises a stator arrangement of essentially C-shaped yokes (50), wherein each of the yokes (50) comprises two free legs (52, 54) for protruding radially inwards to at least partially cover teeth (42) arranged at faces (46) of an essentially circular cylindrical rotor (40), the teeth (42) of the rotor (40) being in alignment with the legs (52, 54) of the yokes (50).

10. The turbocharger according to claim 8, characterised in that a control circuit (ECU) is provided to control the electric machine (30) while the combustion engine (10), is operating at a high speed, and the electric machine (30) operates as a generator and provides electric power.

* * * * *